United States Patent [19]

Hildebrand et al.

[11] Patent Number: 4,460,186
[45] Date of Patent: Jul. 17, 1984

[54] GUIDE WHEEL SUSPENSION FOR A THREE WHEEL SWEEPER

[75] Inventors: Donald L. Hildebrand, Union; Mario J. Martinez, Elgin, both of Ill.

[73] Assignee: Elgin Sweeper Company, Elgin, Ill.

[21] Appl. No.: 345,911

[22] Filed: Feb. 8, 1982

[51] Int. Cl.³ .......................... A47L 11/24; B62D 1/02
[52] U.S. Cl. ........................................... 280/92; 15/83
[58] Field of Search ............... 15/83, 84; 280/92, 711, 280/68; 180/211

[56] References Cited

U.S. PATENT DOCUMENTS

| | | | |
|---|---|---|---|
| 2,685,450 | 8/1954 | Beasley | 280/92 |
| 2,737,674 | 3/1956 | Dempster | 15/84 |
| 2,874,972 | 2/1959 | Andersen et al. | 280/92 |
| 2,935,333 | 5/1960 | Ekas | 280/92 |
| 2,943,819 | 7/1960 | Orloff et al. | 244/50 |
| 2,972,159 | 2/1961 | Swanson et al. | 15/340 |
| 3,186,015 | 6/1965 | Beyerstedt | 15/84 |
| 3,346,272 | 10/1967 | Smith | 280/96.2 |
| 3,539,195 | 11/1970 | Swanson et al. | 280/92 |
| 3,539,196 | 11/1970 | Fleming | 280/92 |
| 3,700,256 | 10/1974 | Jones, Jr. | 280/92 |
| 3,839,610 | 10/1974 | Harlow | 280/92 |
| 4,175,770 | 11/1979 | Draisbach et al. | 280/668 |
| 4,175,771 | 11/1979 | Muzechuk et al. | 280/696 |
| 4,363,151 | 12/1982 | Knowlton | 15/83 |

Primary Examiner—Richard A. Bertsch
Attorney, Agent, or Firm—Hill, Van Santen, Steadman & Simpson

[57] ABSTRACT

A sweeper, which has a pair of front wheels which are mounted on a frame on opposite sides of a dirt hopper, a steerable guide wheel unit mounted on the frame in a tricycle arrangement with respect to the front wheels characterized by the guide wheel unit having a suspension having first and second members arranged with one member being telescopically received and the other member with an arrangement for transmitting torque between the members and the unit has an arrangement positioned between the two members for resiliently suspending the two members. The arrangement for resiliently suspending can comprise a single coiled spring telescopically receiving an outside member or a plurality of spring units that are provided either by themselves or with shock absorber units. The arrangement for transmitting torque can include a splined shaft and an internally splined bore or a plurality of torque transmitting lever arms.

17 Claims, 9 Drawing Figures

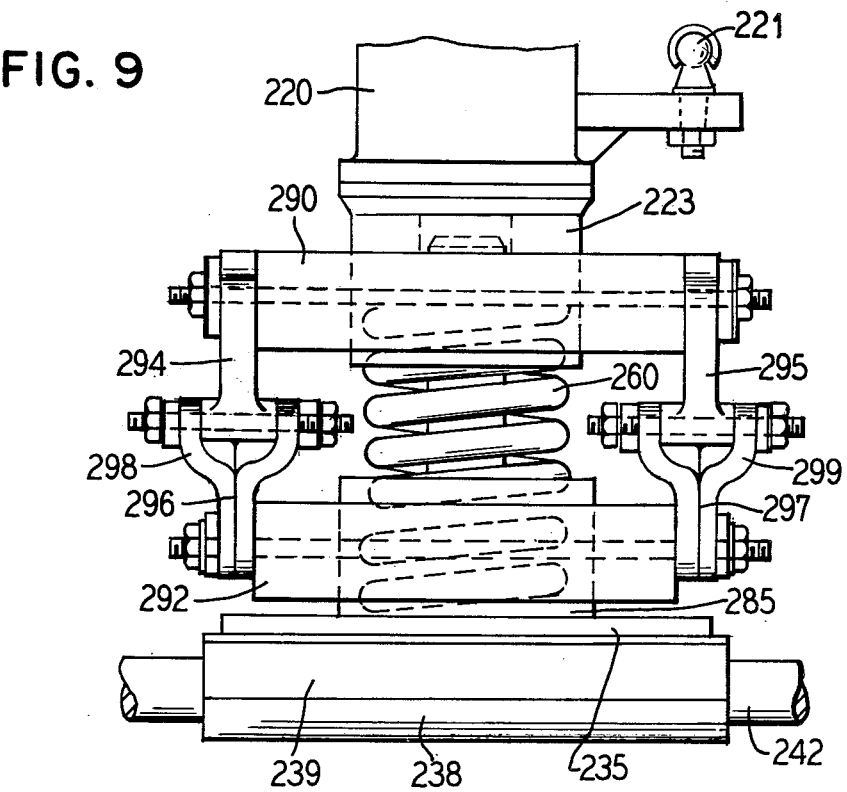

GUIDE WHEEL SUSPENSION FOR A THREE WHEEL SWEEPER

BACKGROUND OF THE INVENTION

The present invention is directed to an improved suspension for a guide wheel or steerable wheel for a three wheeled sweeper which has a pair of widely spaced forward wheels on a frame, a dirt hopper mounted on the frame between the pair of wheels, an arrangement for sweeping and picking up sweepings to deposit them inside of the dirt hopper and a steerable guide wheel unit mounted on the frame in a tricycle arrangement with respect to the front two wheels.

One of the first successful self propelled street sweepers was the 1914 Elgin (tradename) which had a basic wheel and steering geometry that has continued to this day. The 1914 Elgin utilized a tricycle wheel and steering geometry which had a pair of front wheels which were spaced wide apart on the frame of the sweeper to leave room for a dirt hopper which is mounted on the frame between the wheels. These wheels are normally the power driven wheels and are mounted on a fixed axle so that they are not steerable. To steer the sweeper, a single wheel unit which may consist of a pair of closely spaced wheels is mounted on an end of a single vertically extending structural member or strut and the strut is mounted on the frame for rotation about the axis of the member or strut. The wheel position of this third rear wheel unit is controlled by a steering wheel, which is in the hands of the operator. With the dirt hopper being positioned between the drive wheels in the front of the sweeper, these front wheels are carrying most of the load which is added to the sweeper during the sweeping operation. The load on the steering wheel is nearly the same with or without a loaded hopper.

On some three wheeled street sweepers, the hopper and drive wheels are in the rear of the device and the rotatable steering and guide wheel is in the front. Thus, the device will steer similar to a tricycle type farm tractor.

The advantage of a "tricycle" or three wheel steering geometry has been in providing excellent maneuverability for the sweeper. The tricycle steering geometry provides a very short turning radius, which enables close sweeping to and inbetween parked cars, around cul-de-sacs and around short radius corners. In addition, the smaller turning radius enables making a U-turn in a narrow street without requiring backing.

For the successful operation of the brooms and a conveying system used in the sweeper, it has been necessary to maintain a degree of fixed geometry between the road and the sweeping mechanism suspended from the frame of the sweeper. This need for a fixed geometry, has prevented any spring suspension of the driven wheels.

However, without the spring suspension of the wheels particularly the guide wheels, the operator station is not cushioned against bumps. With the known construction when the sweeper guide wheels drops into a pot hole, goes over a railroad track, goes over a sewer hole cover or traverses any rough road, the resulting sudden vibrations are transmitted to the operator stations. These forces will bounce the operator around making the operator very uncomfortable. Also, it increases the difficulty of steering. In some cases, the bouncing is so severe as to the bounce the operators into the sweeper cab roof or cause the operator to temporarily loose control of the sweeper.

In addition, these same forces, which will bounce the operator, also apply sudden jars to the various sweeping mechanism which cause wear and premature failure. For example, these forces over a period a time may cause the guide wheel structure to break loose from the sweeper frame or cause the sweeper frame to crack.

It is noted that in order to improve the ride for the operator, special air suspensions or cushion seats have been suggested or used. However, this does not reduce the road shocks to the vehicle structure.

SUMMARY OF THE INVENTION

The present invention is directed to an improved suspension for the guide wheel assembly or unit which enables the guide wheel unit to be rotated along the axis of the vertically extending structure and also to reciprocate up and down without changing the broom and conveyor geometry to significantly adversely effect the sweeper performance.

To accomplish these tasks, the present invention is directed to an improvement in a sweeper which has a frame supporting a pair of widely spaced, driven wheels, a dirt hopper mounted on the frame between the driven wheels, means for picking up sweepings and depositing the same in the dirt hopper, a steerable guide wheel unit mounted on the frame in a tricycle arrangement with respect to the driven wheels, said unit being rotated about a substantially vertical axis in response to steering inputs.

The improvement is that the guide unit has a resilient suspension that includes a first member mounted on the frame for rotation about the axis of the member in response to the steering input, a second member having an end supporting at least one guide wheel, one of said first and second members being a tubular member and the other member being telescopically received in said one member and being freely movable axially therein, means for transmitting torque between said first and second member, and resilient means for suspending the load placed on said members so that shocks applied to the wheel unit are compensated for by the resilient suspension.

In one embodiment of the invention, the means for transmitting torque comprises the first member having a block containing an internal spline bore and the second member being a splined shaft which is telescopically received in the splined bore of the block of the first member. It is also possible to transmit the torque by utilizing a key way, by having at least two sets of coacting first and second members arranged side by side or by the first and second members assuming some irregular cross section such as either a rectangular cross-section or a triangular cross-section. In another embodiment, the second member is a cylindrical shaft telescopically received into a cylindrical hollow tubular member forming the first member and the torque is transmitted by a pair of pivoted levers which allow axial movement of the two members without any back lash.

The spring means may be a single spring which telescopically surrounds the first and second members or may be a plurality of spring units acting between plates which are secured to the two members. In addition, shock absorbers are preferably provided to further compensate for shock forces placed on the wheel unit and to damping oscillation.

BRIEF DESCRIPTION OF THE DRAWINGS

FIG. 9 is an end view of the device of FIG. 8.

DESCRIPTION OF THE PREFERRED EMBODIMENTS

Figures 1, 2:
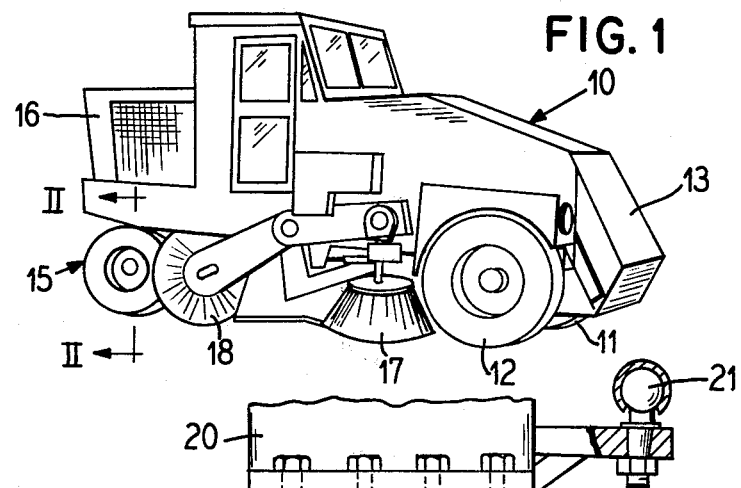
FIG. 1 is a perspective view of a three wheeled street sweeper utilizing the present invention.
FIG. 2 is a cross-sectional view with portions in elevation for purposes of illustration taken alone the line II—II of FIG. 1.

The principles of the present invention are particularly useful in a three wheeled street sweeper generally indicated at 10 in FIG. 1. The sweeper 10 has a frame with a pair of front wheels 11 and 12, which are driven wheels and are positioned on the outside of a dirt hopper 13. In order to steer the sweeper 10, a guide wheel unit generally indicated at 15 is positioned in the back of the sweeper and is mounted on the frame for rotation around a substantially vertical axis. As illustrated, the wheels 11 and 12 and the wheel unit 15 form a tricycle or three wheel arrangement which enables a very good maneuverability for the sweeper 10.

The sweeper 10 besides having a power source such as an engine 16 that is positioned substantially above the wheel unit 15 has a gutter brush or broom 17 and the main sweeping broom 18 which can be raised from a sweeping position for transportation and are driven by a power linkage to the main power source in a conventional manner. In addition, the sweeper 10 includes a conveying means for receiving the sweepings from the main broom 18 and for transferring those to the dirt hopper 13.

Figure 3:
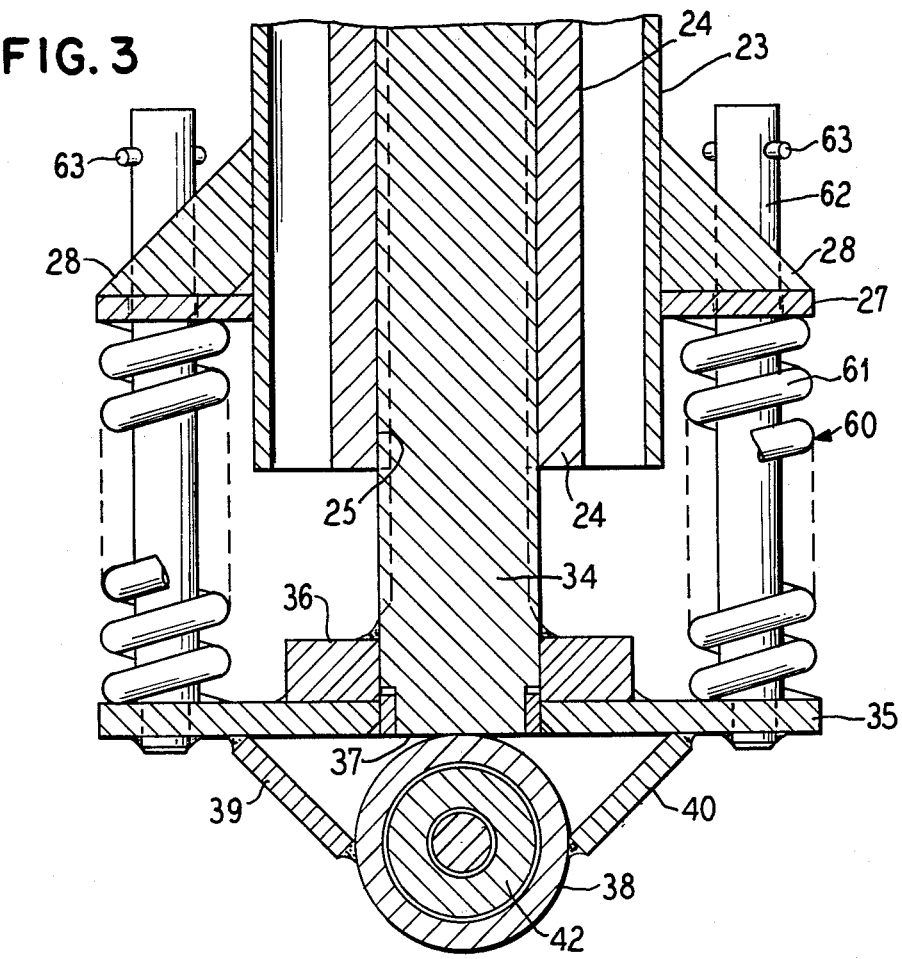
FIG. 3 is a cross-sectional view taken along the lines III—III of FIG. 2.
Figure 4:
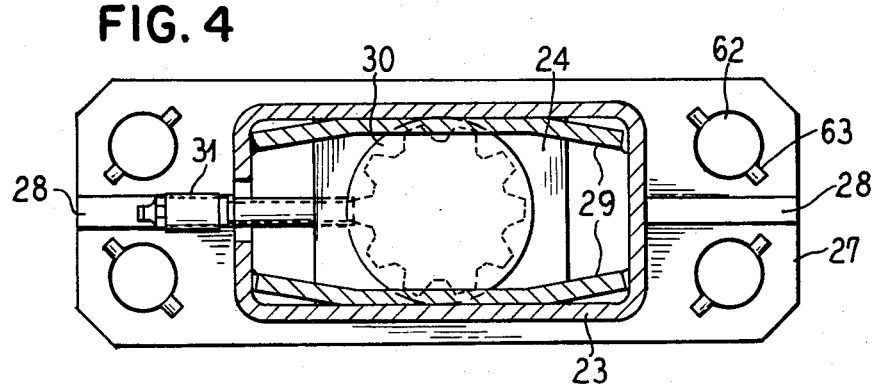
FIG. 4 is a cross-sectional view taken along the lines IV—IV of FIG. 2.
Figure 5:
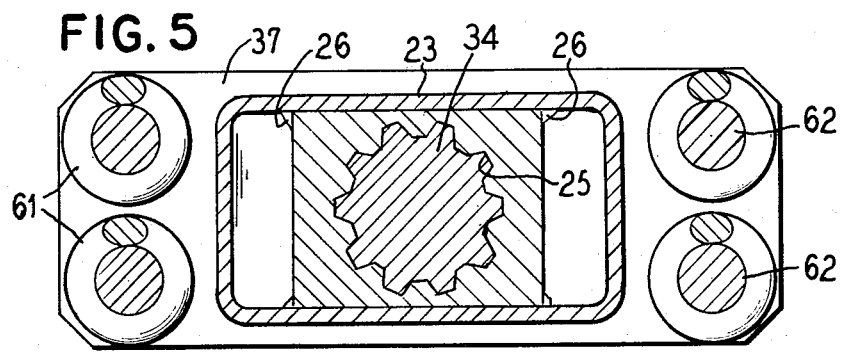
FIG. 5 is a cross-sectional view taken along the lines V—V of FIG. 2.

The guide wheel unit 15 (see FIG. 2) comprises an upper strut portion 20, which is mounted for rotation around a vertical axis in the frame of the sweeper 10. To rotate the upper strut 20, a linkage system to the steering wheel in the operator's cab is provided and as illustrated in FIG. 2 includes a ball joint which is mounted on the upper strut 20 and which ball joint 21 receives a portion of the linkage to the steering wheel. A first member 23 is secured to an upper strut 20 by a plurality of bolts such as 22. The first member 23 is a tubular member which has a rectangular cross-section. As best illustrated in FIGS. 3 and 5, the tubular member 23 adjacent the lower end is provided with a block 24 which has an internally splined bore 25. The block 24 is secured in the rectangular tubular member 23 by welds such as 26. Adjacent the lower end of the first member 23, the member is provided with a flange or plate 27, which is welded to the tube 23 and is provided with reinforcing gussets or triangular portions 28. The tubular member 23 also is provided with an additional stiffening mechanisms above the block 25 which mechanism includes a pair of stiffening members 29 which are best illustrated in FIG. 4. Also, it is noted that the block 24 on a top surface is provided with a circular cap 30, which closes the upper end of the splined bore 25 and that the bore 25 has a grease fitting 31 to enable inserting grease into the bore.

A second member 34, which is illustrated in FIGS. 3 and 5, has a splined shaft and is telescopically received in the splined bore 25 of the first member 23. The second member has a lower end 37 which is provided with a flange 35 which is welded to a reinforcing pad 36, which is also welded to the shaft 34. An axle housing 38 is secured by two welded parts or plates 39 and 40 to the plates 35 and 37. As best illustrated in FIG. 2, the housing 38 receives an axle 42 which has ends 43 and 44 on opposite sides of the housing 38. The end 44 receives roller bearings of a hub 45, which hub 45 supports the wheels or rim arrangements 46 for a tire such as normal tube type automotive tire 47. In a similar manner, the end 44 receives the roller bearings of a hub 50 of a rim assembly 51 for a tire 52. In the embodiment illustrated, the unit 15 has a pair of closely spaced tires such as 47 and 52.

To provide a resilient suspension between the two members 23 and 34, a plurality of coil spring units 60 are positioned between the plates or flanges 27 and 35. As illustrated, each spring unit 60 includes a spring 61 surrounding a guide pin arrangement 62 which is secured in the lower plate 35 and extends through an opening in the upper plate 27. To prevent the disconnection of the two parts due the force of the springs 61, each of the guides 62 is provided with a stop such as 63. This stop prevents the disconnection of the wheels and axle, for example, when the sweeper rear end is lifted for towing or when a very high bounce occurs. As illustrated, four coil spring units 60 are provided and in a loaded condition they will enable a movement of the plates such as 35 and 27 towards each other by a small amount which is in the range of an inch to an inch and one-half before the spring 61 will prevent further movement because of contact between the coils. Thus, while in the normal position such as illustrated in FIG. 3 and due to the fact that the weight on the guide wheel unit 15 is substantially constant, the normal suspended position is approximately one-inch above the lowermost position. Thus, the resilient positioning of the spring arrangement prevents substantial changes in the position of the brushes during a sweeping operation.

Figure 6:
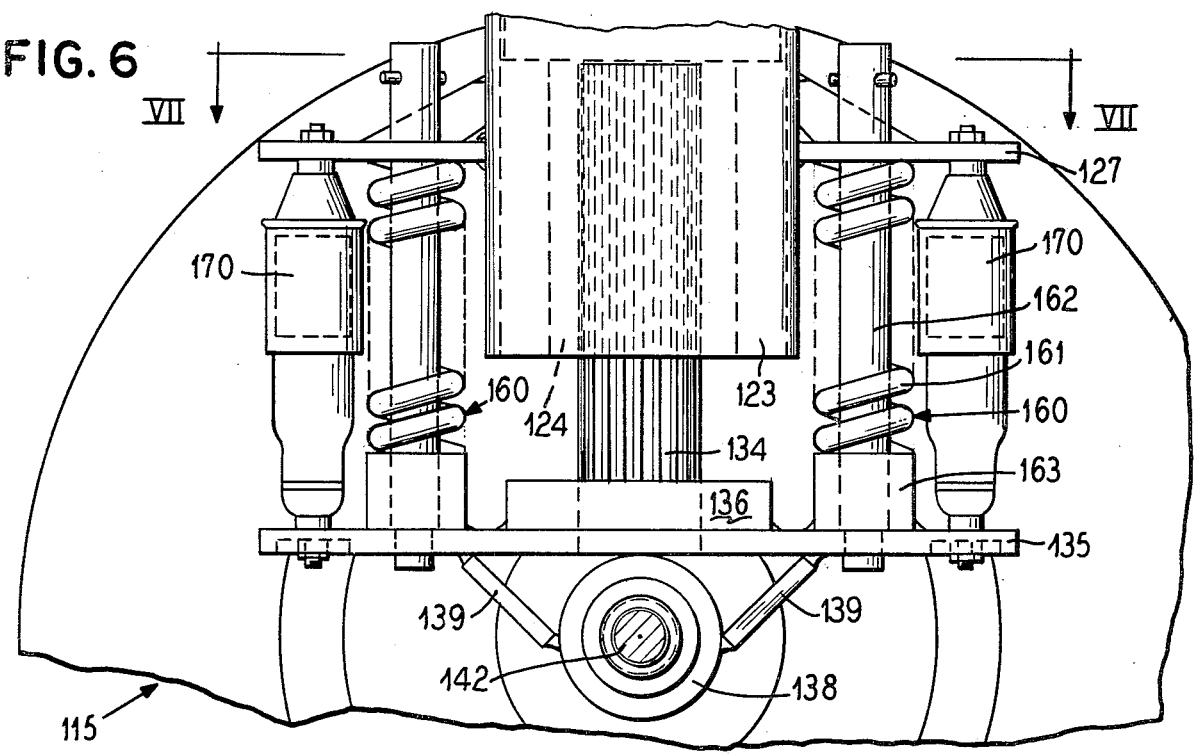
FIG. 6 is a side view with portions removed for purposes of illustration of an embodiment of the invention.
Figure 7:
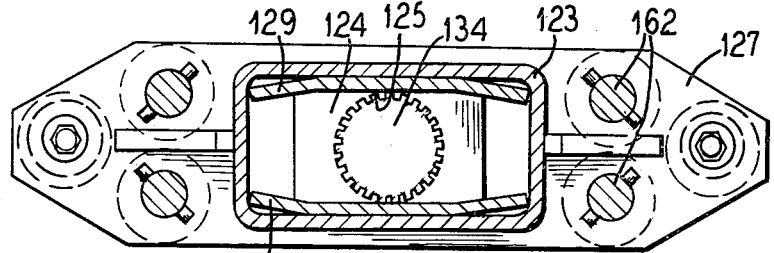
FIG. 7 is a cross-sectional view taken along the line VII—VII of FIG. 6.

An embodiment of the guide unit is generally illustrated at 115 in FIGS. 6 and 7. In this embodiment, the upper strut terminates in a first member 123 which as illustrated in FIG. 7 is a hollow rectangular tubular member. A block 124 is welded in the member 123 adjacent the lower end. The block 124 is provided with an internally splined bore 125 which receives a splined shaft 134 that forms the second member of the strut combination. As in the previous embodiment, the upper portion of the first member 123 is reinforced by reinforcing plates or members 129 which are welded thereto. Also, a plate or flange 127 is welded to the outside portion of the tube 123 at a point spaced from the lower end. As in the previous embodiment, the second member 134 on a lower end is connection to a plate 135 through a support block 136. The plate 135 is connected to a housing 138 by plates 139. As in the previous embodiments, the housing 138 rotatable supports an axle 142 for one or more tires.

Between the plates 135 and 127, a plurality of spring units 160 are arranged and includes a coil spring 161 which is mounted concentrically on a spring guide pin 162 which is secured on the lower plate 135 with a spring support 163. The upper end of the spring guide pin 162 is loosely received in an aperture of the upper plate 127. Thus, each of the coil springs 161 acts between the two plates to urge the plates apart. As illustrated, four spring units 160 are provided and in addition, a pair of shock absorbers 170 are also connected between the two plates 127 and 135. The shock absorbers, having a different force rate between compression and extension, effectivly dampen the spring oscillations. The shock absorber forces also add to the forces required to depress the springs and thus make the suspension sligthly stiffer.

Figure 8:
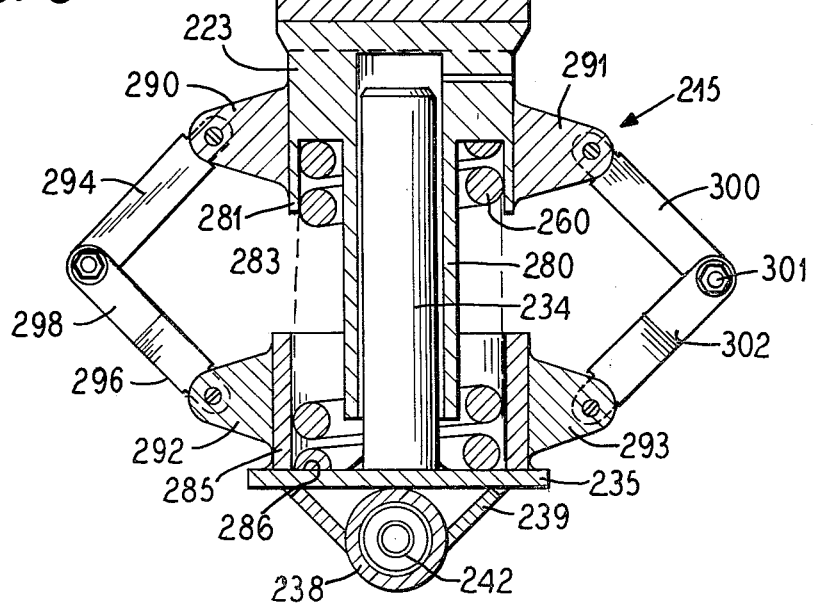
FIG. 8 is a partial cross-sectional view similar to FIG. 3 of a third embodiment of the invention.

Another embodiment of the wheel unit is illustrated in FIGS. 8 and 9 and is generally indicated at 215. In the wheel unit 215, an upper strut member 220 has a lever which supports a ball joint 221 for the linkage extending to the steering wheel in the operator's cabin. Secured on the upper strut 220 is a first member 223, which is provided with a tubular projection or sleeve 280, and a concentric outer projection or sleeve 281, which forms a socket 283. A second member 234 is a cylindrical shaft which is telescopically received in the sleeve 280 and terminates in a plate 235 which is connected to an axle housing 238 for a wheel axle 242 by plates or members 239. The plate 235 also has welded thereto a ring-like sleeve member 285 which is concentric with the shaft 234 and coacts therewith to form a socket type retainer 286. To bias the two members 223 and 234 apart, a spring element 260 such as a coil spring is received in the sockets 283 and 286 and acts against the plate 235 and is thus concentric to a tubular sleeve 280 and the shaft 234.

In this embodiment, a torque transmission means or arrangement is provided by a pair of bars 290 and 291 which are secured such as by welding on the outer surface of the member 223 and extending parallel to one another. In addition, a second pair of bar members 292 and 293 are secured at the member 285, which is secured to the plate 235. A pair of lever arms 294 and 295 are secured to the ends of the upper bar member 290 as best illustrated in FIG. 9 to pivot in planes, which are parallel to each other and the axis of the members 223 and 234. As illustrated in FIG. 9, the arms 294 is pivotable connected to an arm 296 and the arm 295 is connected to an arm 297. Each of the arms 296 and 297 is composed of two levers forming an end portion 298 and 299, respectively, which receives the ends of the lever arms 294 and 295. The other ends of the arms 296 and 297 are connected to the end of the lower member 292.

The ends of other members 291 and 293 are also interconnected by a pivotable two lever arrangement such as a lever 300 which is pivotably connected to the upper member 291 and has its other end pivotably connected at 301 to a lower lever 302 that is pivotably connected to the lower member 293. These lever are arrangements such as 294 and 296 and 300 and 302 are preferably in the same plane and allow reciprocating movement between the members 234 and 223 and also will transmit torque between the two members. Thus, the unit 215 can be rotated on the frame by the steering linkage which includes the ball and socket joint 221 to allow steering of the sweeper.

In addition, to the illustrated embodiments, means for transmitting torque between the members can also include other arrangements. For example, it can be a square shaft received in the square tube, or a key way between the two members. Another possibility is to use two tubular members side by side to receive a pair of shaft members.

Although various minor modifications may be suggested by those versed in the art, it should be understood that I wish to embody within the scope of the patent granted hereon, all such modifications as reasonably and properly come within the scope of my contribution to the art.

We claim:

1. In a sweeper having a frame supporting a pair of widely spaced driven wheels, a dirt hopper mounted on the frame between the driven wheels, means carried on the frame for picking up sweepings and depositing the same inside of the dirt hopper, a steerable guide wheel unit mounted on the frame in a tricycle arrangement with respect to the driven wheels, said unit being rotated about a substantially vertical axis in response to steering inputs, the improvements comprising the guide wheel unit having a resilient suspension including a first member mounted on the frame for rotation about the axis of the member in response to the steering input, a second member having a lower end supporting at least one guide wheel, one of said first and second members being a tubular member and the other member being telescopically received in said one member and being freely movable axially therein, means for transmitting torque between said first and second members, and resilient means for suspending the load placed on said members so that the shock applied to the wheel unit is compensated for by the resilient suspension.

2. In a sweeper according to claim 1 wherein the first member is the tubular member telescopically receiving a shaft portion of the second member.

3. A sweeper according to claim 2, wherein said resilient means includes a coiled spring concentric to the first and second member.

4. In a sweeper according to claim 3, wherein the means for transmitting torque comprise a pivotable two lever arrangement secured between the first and second members to allow reciprocal motion therebetween while transmitting torque therebetween.

5. In a sweeper according to claim 1, wherein the first member is a tubular member having a block secured therein adjacent a lower end, said block having a bore telescopically receiving a shaft portion of the second member, and wherein the means for transmitting the torque comprises said shaft portion being a splined shaft and the bore of said block being a splined bore matching the splined shaft.

6. In a sweeper according to claim 5, wherein the first member has a first plate secured at a portion spaced from the lower end thereof, said second member having a second plate, and wherein the resilient means comprises at least one spring unit disposed between said plates, each of said spring units including a spring guide pin secured to one of said first and second plates and loosely received in the other of said first and second plates, a coil spring telescopically surrounding said guide pin and acting to bias said plates apart, said resilient means also including means limiting the maximum spacing between said plates.

7. In a sweeper according to claim 6, wherein the resilient means includes at least two spring units, and said means for limiting comprises a stop disposed on each of the guide pins.

8. In a sweeper according to claim 6, wherein the resilient means includes at least two spring units, and said means for limiting the maximum spacing comprises at least one shock absorber unit attached between each of said first and second plates to limit the maximum spreading thereof and to compensate for impact loading of said unit.

9. In a sweeper according to claim 1, wherein each of said first and second members has a plate secured thereon, and said resilient means includes at least one spring unit having a pin telescopically received in a coil spring and being secured to one of said plates and extending loosely through an aperture of the other plate with means for preventing maximum separation between said plates.

10. In a sweeper according to claim 9, wherein said means for preventing maximum separation includes at least one shock absorber attached between said plates.

11. In a three wheeled sweeper including a frame with a pair of widely spaced forward wheels and a dirt hopper mounted on a frame between the wheels, sweeping means disposed on said frame, means carried on the frame for picking up sweepings and depositing the same into the dirt hopper, a steerable guide wheel unit mounted on the frame in a tricycle arrangement with respect to the front wheels, the improvements comprising the guide wheel unit comprising a suspension including a tubular block mounted on the frame and defining a block tube having internal splines, a splined shaft received in the block tube for free vertical movement relative thereto, a guide wheel housing having an axle secured to an end of the spline shaft, a guide wheel tire and tube assembly mounted on opposite ends of said axle, and relative resilient means being disposed between said block tube and splined shaft so that the splined shaft and other components therewith are relative moveable with respect to the frame as said splined shaft moves in the tubular block carried by the frame.

12. In a three wheeled sweeper according to claim 11, wherein said resilient means comprises a plurality of coil spring arrangements secured between said splined shaft and block tube.

13. In a three-wheeled sweeper according to claim 12, which includes at least one shock aborber mounted between said block tube and said spline shaft to dampen the spring oscillations.

14. In a three wheeled sweeper unit according to claim 11, wherein each of the block tubes and the spline shaft has a plate extending in a plane perpendicular to the axis of the bore and the spline shaft, and said resilient means being disposed to act between said plates.

15. In a sweeper having a frame supporting a pair of widely spaced driven wheels, a dirt hopper mounted on the frame between the driven wheels, means carried on the frame for picking up sweepings and depositing the same inside of the dirt hopper, a steerable guide wheel unit mounted on the frame in a tricycle arrangement with respect to the driven wheels, said unit being rotated about a substantially verticle axis in response to steering inputs, the improvements comprising the guide wheel unit having a resilient suspension including a first member mounted on the frame for rotation about the vertical axis of the member in response to the steering input, a second member supporting at least one guide wheel, one of said first and second members having at least one bore therein with an open end and the other member being telescopically received in said one member and being freely movable axially therein, means for transmitting torque between said first and second members, and resilient means for suspending the load placed on said members so that the shock applied to the wheel unit is absorbed by the resilient suspension.

16. In a sweeper according to claim 15, wherein the first member is a tubular member having a block secured therein adjacent a lower end, said block having a bore telescopically receiving a shaft portion of the second member, and wherein the means for transmitting the torque comprises said shaft portion being a splined shaft and the bore of said block being a splined bore matching the splined shaft.

17. In a sweeper according to claim 16, wherein the first member has a first plate secured at a portion spaced from the lower end thereof, said second member having a second plate, and wherein the resilient means comprises at least one spring unit disposed between said plates, each of said spring units including a spring guide pin secured to one of said first and second plates and loosely received in the other of said first and second plates, a coil spring telescopically surrounding said guide pin and acting to bias said plates apart, said resilient means also including means limitng the maximum spacing between said plates.

* * * * *